United States Patent [19]
Abe

[11] Patent Number: 5,581,399
[45] Date of Patent: Dec. 3, 1996

[54] BINOCULARS

[75] Inventor: Tetsuya Abe, Tokyo, Japan

[73] Assignee: Asahi Kogaku Kogyo Kabushiki Kaisha, Tokyo, Japan

[21] Appl. No.: 253,701

[22] Filed: Jun. 3, 1994

[30] Foreign Application Priority Data

Jun. 3, 1993 [JP] Japan .................................. 5-158008
May 27, 1994 [JP] Japan .................................. 6-138074

[51] Int. Cl.⁶ .......................... G02B 23/00; G02B 27/02
[52] U.S. Cl. .......................... 359/410; 359/407; 359/482
[58] Field of Search .................................. 359/399–429, 359/362, 480–481; 360/35.1; 354/219–225; 250/201.2–201.8

[56] References Cited

U.S. PATENT DOCUMENTS 5,179,478   1/1993   Aoki .................................. 360/35.1

FOREIGN PATENT DOCUMENTS 4355591   12/1992   Japan .

Primary Examiner—Thong Nguyen
Attorney, Agent, or Firm—Greenblum & Bernstein P.L.C.

[57] ABSTRACT

Binoculars having two telescopic optical systems for forming a stereoscopic image of an object. Each telescopic optical system has an image sensor, a first optical system, a second optical system and a display. The first optical system forms an image of the object on the image sensor, with the image sensor outputting an electrical signal that represents the image. The second optical system is used for viewing another image of the object. The display reproduces the electrical signal output by the image sensor. The binocular further includes a switch that switches between a first mode where the image is viewed using the second optical system, and a second mode where the image is reproduced using the display.

19 Claims, 4 Drawing Sheets

BINOCULARS

BACKGROUND OF THE INVENTION

The present invention relates to binoculars, and more specifically to electro-imaging cameras.

Binoculars are an optical instrument having two telescopic optical systems (telescopes), each telescope having an objective lens, an image erector and an eyepiece lens. The binoculars provide an enlarged, stereoscopic image of a distant object, through the use of the two telescopes.

Conventionally, two methods are used to display a stereoscopic image recorded by a video camera or a still-video camera.

The first method is to record both right and left telescopic images using separate cameras. Since this method requires two cameras it is cumbersome and difficult to implement. Further, this method is impractical because when a still image is taken of a moving object, both cameras must simultaneously track the moving object and open their shutter mechanisms at precisely the same time.

The second method records stereoscopic images using a single recording camera having a pair of image recording optics, which corresponds to the pair of telescopic images. The operation and handling of the equipment is much easier than with the first method since only one camera is used. However, the camera has only one viewfinder, and therefore it is difficult to frame the stereoscopic image. Therefore there is usually a discrepancy between the picture that was seen in the viewfinder and the picture that was recorded by the camera.

SUMMARY OF THE INVENTION

It is therefore an object of the present invention to provide binoculars which selectively view optically projected images and electronically reproduced images.

It is another object of the present invention to provide binoculars which can display stereoscopic images before recording them, and which can also display stored stereoscopic images.

According to an aspect of the present invention, a pair of binoculars is provided which includes a pair of telescopes. Each of the telescopes includes an image sensor, which outputs an electrical signal, and a first optical system for forming an image of an object on the image sensor is provided.

Each of the telescopes is also provided with a second optical system for viewing another image of the object. A portion of the first optical system and a portion of the second optical system have common optical elements. Each of the telescopes is further provided with a display mechanism which electronically reproduces the electronic signal output by the image sensors.

The pair of binoculars is provided with a switching mechanism to switch between a first mode in which the another image is viewed, and a second mode in which the image display mechanism electronically reproduces the electronic signal output by the image sensors.

According to another aspect of the present invention, a pair of binoculars is provided which includes a pair of telescopic systems. Each telescopic system includes a first optical system for forming an image of an object to be viewed on at least two image planes, and a second optical system for projecting the image formed on one of the image planes.

Each telescopic system further includes an image detecting system for converting the image formed on the other of the image planes to an electrical signal.

Each telescopic system is also provided with a display for displaying a reproduced image signal based on the electrical signal. The display is located between the first optical system and the second optical system, respectively.

Each telescopic system also includes a back light which is located at a first position between the display and the first optical system, where the back light prevents the image from being formed on one of the image planes, and a second position where the back light allows the image to be formed on one of the image planes.

Each telescopic system is provided with a controller, having two operating modes. When the controller is in one operating mode, the back light is located at the first position and the display displays the reproduced image signal, and when the controller is in the other operating mode, the back light is located at the second position and the display is OFF.

According to a further aspect of the present invention, a pair of binoculars is provided which includes a pair of telescopic systems. Each telescopic system includes an optical mechanism for forming an image on an image plane and an imaging mechanism for converting the image to an electronic signal.

Each telescopic system also includes a storage mechanism which stores the electronic signal and a display mechanism which displays the electronic signal.

Each telescopic system also includes a control mechanism which has a first operating mode where the image signal is stored in the storage mechanism and a second operating mode where the electronic signal stored in the storage mechanism is retrieved and displayed on the display mechanism.

DESCRIPTION OF THE EMBODIMENTS

Figure 1:
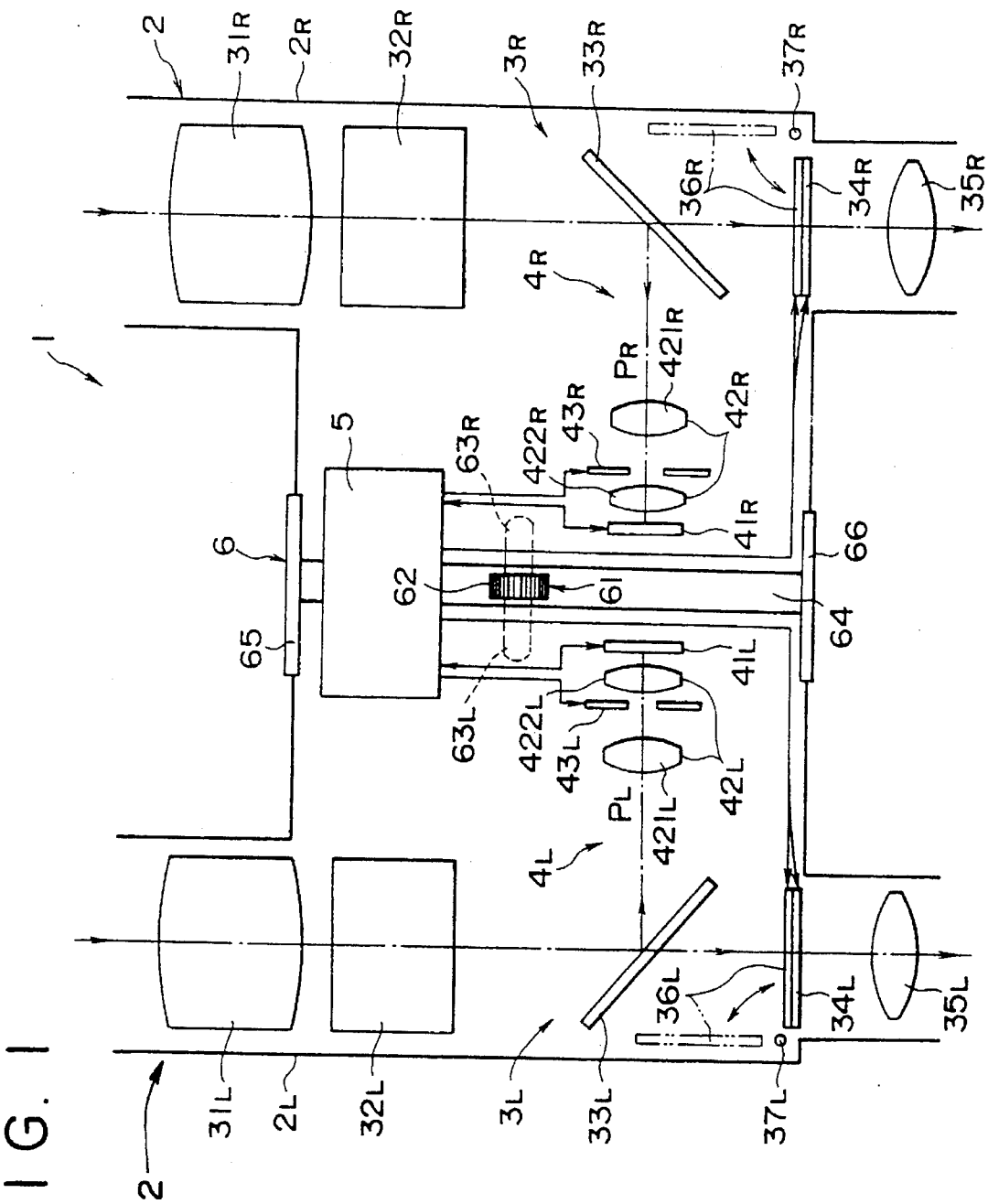
FIG. 1 is a schematic diagram of binoculars according to the present invention.

FIG. 1 is a schematic diagram of binoculars 1 used to record and to playback images, according to the present invention.

The binoculars 1 has a pair of telescopic optical systems (hereinafter referred to as telescopes) 2, disposed therein, i.e., a left telescope and a right telescope. The left telescope 2 has a housing 2L and the right telescope 2 has a housing 2R. The distance between the left housing 2L and the right housing 2R can be adjusted by an adjusting mechanism 6, described later.

The left housing 2L of left telescope 2 houses a finder optical system 3L and an image sensing system 4L. The finder optical system 3L includes an objective lens 31L, an image erecting optical system 32L, and a half mirror 33L, a display 34L and an eyepiece lens 35L.

The objective lens 31L is mounted so that it may be focused manually or automatically by an autofocus system (not shown) to form an image of an object on a plane of the display 34L. The objective lens 31L may comprise many lenses; thereby providing a zooming function to vary the magnification of the image formed on the display 34L. The image erecting prism 32L, which can be, for example, a Porro prism, or a Schmidt prism, provides an erect image on the display 34L. The image viewed through the eyepiece 35L is, therefore, an erect image.

The display 34L used in the present invention is a flat panel type liquid crystal display (hereinafter referred to as an LCD). The LCD consists of a matrix of pixels which form an image when voltage is applied to the display 34L. When no voltage is applied, no image is formed and the LCD appears transparent, thus allowing light to pass through the display 34L.

The eyepiece 35L magnifies the image of the object formed or displayed on the image display plane, optically or electronically, to a desired size. The eyepiece 35L also includes a diopter adjustment mechanism, (not shown).

A back light 36L includes a surface, light source such as a cold cathode flat fluorescent tube, which is mounted so that it can pivot about an axis 37L. The back light 36L is driven by a back light driver circuit (not shown). When an image is to be reproduced on the display 34L, the back light 36L is located behind the display 34L from the eyepiece side. A rear surface of the back light 36L is composed of an opaque material, thereby blocking light transmitted by the finder optical system 3L. If the image produced by the finder optical system 3L is to be viewed, the back light 36L is located next to a sidewall of the housing 2L, i.e., aligned parallel to a finder optical axis, as shown in FIG. 1.

The opaque rear surface of the back light 36L prevents the image produced by the finder optical system 3L from being superimposed on an electronically reproduced image that is to be shown on the display 34L.

Therefore, as described above, light rays (shown by a broken line) pass through the objective lens 31L, the image erecting prism 32L, and the half mirror 33L to form an image on the plane of the display 34L.

The image sensing system 4L includes the objective lens 31L, the image erecting prism 32L, and the half mirror 33L of the finder optical system 3L, as well as an image sensor 41L, an image reduction optical system 42L and an aperture diaphragm 43L.

The image sensor 41L is capable of photo-electric conversion as well as charge storage, and in cooperation with a scanning circuit (not shown), converts an optical image to a video signal. A CCD (charge coupled device) is used in the image sensor 41L. In this case, the pixels of the CCD correspond to the pixels of the LCD.

The image reduction optical system 42L is located between the half mirror 33L and the image sensor 41L, and includes a condenser lens 421L and an image forming lens 422L. The aperture diaphragm 43L is positioned in between the condenser lens 421L and the image forming lens 422L.

The light rays reflected by the half mirror 33L forms an image at a point PL in front of the condenser lens 421L, and is then transmitted by the condenser lens 421L to the image forming lens 422L to be focused on the image sensor 41L. Point PL and display 34L are the same distance from the half mirror 33L, and thus the same image is formed at PL and on the plane of the display 34L. Therefore, the image detected by the image sensor 41L is the same as that formed on the plane of the display 34L.

The aperture diaphragm 43L is driven by an aperture driving circuit 10 (see FIG. 3) to control brightness and depth of field of a reproduced image displayed on the display 34L.

The image formed on a light receiving surface of the image sensor 41L, as described above, is converted into a video signal and processed by a video signal processor 5 built into the body of the binoculars 1 and then reproduced on the display 34L. The video signals are also sent to an external recording and playback device 14 (see FIG. 3) and recorded on a recording medium.

The right telescope 2 is similar to the left telescope 2 described above. More specifically, the right telescope 2 has a housing 2R which houses a finder optical system 3R and an image sensing system 4R. The finder optical system 3R includes an objective lens 31R, a image erecting optical system 32R (including, inter alia, a back light 36R mounted so that it can pivot about an axis 37R), a half mirror 33R, a display 34R and an eyepiece lens 35R. These elements have the same functions and characteristics as the elements having the same reference numerals for the finder optical system 3L. Further the half mirror 33R forms an image at point PR in a manner similar to the way half mirror 33L forms an image at point PL.

The image sensing system 4R includes the objective lens 31R, the image erecting prism 32R, and the half mirror 33R of the finder optical system 3R, as well as an image sensor 41R, an image reduction optical system 42R (including, inter alia, a condenser lens 421R and an image forming lens 422R) and an aperture diaphragm 43R. These elements have the same functions and characteristics as the elements having the same reference numerals for the image sensing system 4L.

The distance between the finder optical systems 3R and 3L may be adjusted by the adjustment mechanism 6.

Figure 2:
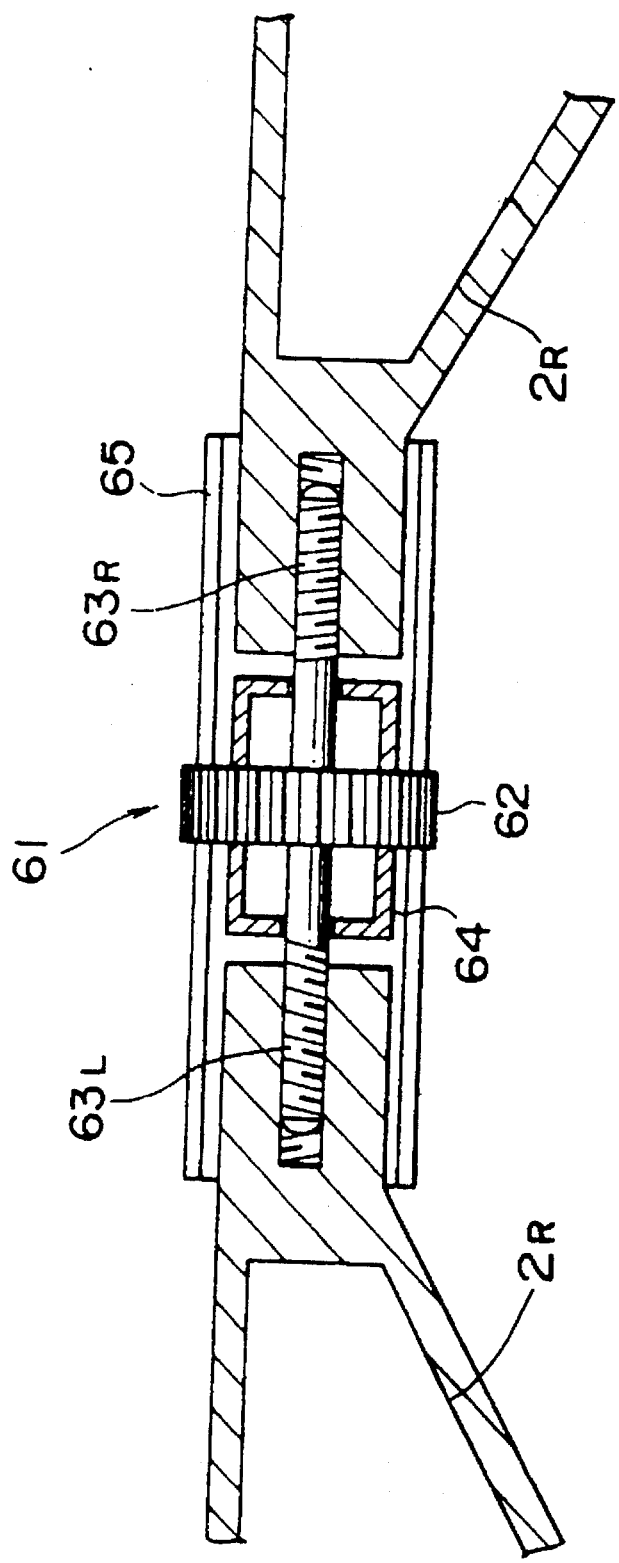
FIG. 2 is a cross-sectional view of a mechanism used to adjust a distance between left and right optical systems of the binoculars shown in FIG. 1.

The adjustment mechanism 6 is located between the right housing 2R and the left housing 2L as shown in FIG. 1. As shown in FIG. 2, the adjustment mechanism 6 includes an adjusting screw 61, a base 64 which supports the adjusting screw 61 so that it can turn on its axis, and a pair of guide rails 65 and 66 assembled on the front and back end of the binoculars 1 to guide the movement of both housings 2R and 2L. The adjusting screw 61 includes a knob 62, and a pair of screws 63R and 63L which extend into the housings 2R and 2L to thereby connect both housings. The screws 63R and 63L are threaded in opposite directions to each other.

As the knob 62 is turned to rotate the adjusting screw 61 about its axis, both housing 2R and 2L move along the guide rails 65 and 66 to narrow or widen a distance therebetween according to the amount and direction of the rotation of the screw adjusting 61.

Further rotating knob 62, the distance between the finder optical systems 3R and 3L can be adjusted. The adjustment mechanism 6 moves the finder optical systems 3L and 3R along a linear path that is perpendicular to both optical axes of the finder optical systems 3L and 3R, to adjust the distance therebetween, but does not rotate the electronically reproduced images shown on the displays 34L and 34R. This preserves the parallel orientation of the displays 34L and 34R.

Figure 3:
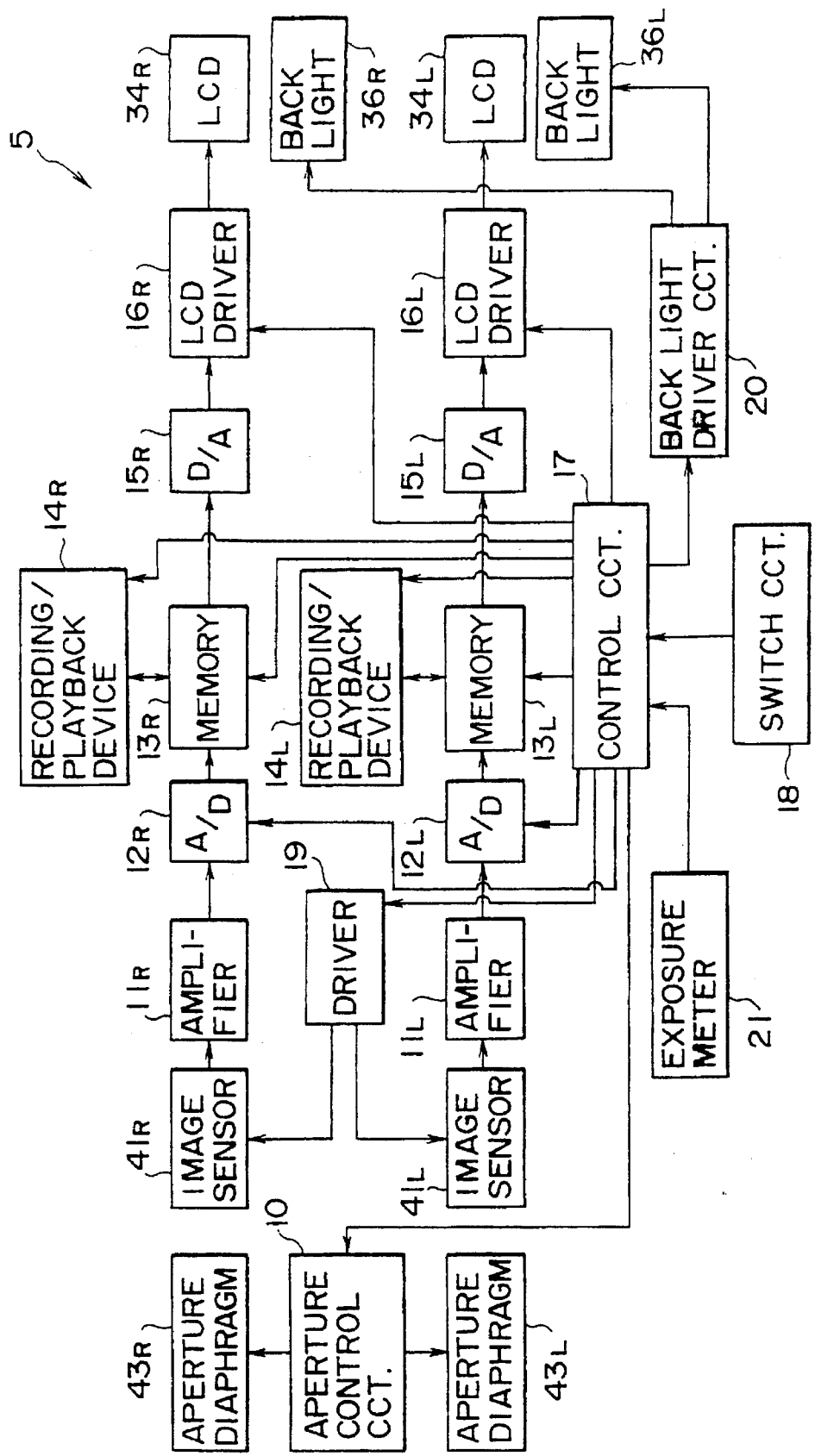
FIG. 3 is a functional block diagram of the binoculars shown in FIG. 1, according to a first embodiment of the present invention.

FIG. 3 shows a block diagram of the video signal processor 5 according to a first embodiment of the present invention. The video signal processor 5 includes a left telescope circuit which processes the video signal output from the image sensor 41L, and a right telescope circuit which processes the video signal output from the image sensor 41R. Since both circuits are similar, only the left telescope circuit will be described below in detail.

The left telescope circuit of the video signal processor 5 includes an amplifier 11L which amplifies the video signal output from the image sensor 41L, and A/D converter 12L which converts analog video signals output by the amplifier 11L to digital signals, a memory 13L which stores the digital signals, a recording and playback device 14L which records the digital signals stored in the memory 13L onto a recording medium and/or reads out recorded signals for playback. The circuitry further includes a D/A converter 15L which converts digital image signals read out from the memory 13L into analog signals, an LCD driver circuit 16L which drives an LCD panel of the display 34L.

The right telescope circuit similarly includes an amplifier 11R, an A/D converter 12R, a memory 13R, a recording and playback device 14R, a D/A converter 15R and an LCD driver circuit 16R.

The video signal processor 5 further includes a control circuit 17 to control the operation of the circuits mentioned above. The control circuit 17 includes a synchronization signal generator (not shown) which sends synchronization and control signals to the A/D converters 12L and 12R, memories 13L and 13R, recording and playback devices 14L and 14R, D/A converter 15L and 15R and LCD driver circuits 16L and 16R to the aforementioned circuits as required.

The control circuit 17 sends a signal to a driver circuit 19 which drives the image sensors 41R and 41L, thereby controlling the stored charge transfer timing of each pixel of the image sensors 41L and 41R and the exposure time (charge storing time) of both image sensors 41L and 41R. The exposure times of each sensor are adjusted to be the same, by adjusting the charge storing times of each image sensor 41R and 41L respectively so that the images formed on each image sensor has the same exposure. This is because the aperture diaphragms 43L and 43R are controlled synchronously.

The control circuit 17 also sends signals to a back light driver circuit 20 to control the positioning and actuation of the back lights 36L and 36R. Brightness levels of both back lights 36L and 36R are controlled to be the same, and the positioning of the back lights 36L and 36R is synchronized.

An exposure meter 21 provides luminance information to the control circuit 17, which then sends control signals to an aperture control circuit 10 to control the aperture diaphragms 43L and 43R in order to obtain a proper luminance level.

Thus, the control circuit 17 controls the left telescope circuit and the right telescope circuit to be operated in synchronization and under the same exposure conditions, thereby achieving proper alignment and the same brightness levels for the reproduced images displayed by the displays 34L and 34R.

Further, the control circuit 17 is connected to a switch circuit 18 which includes a main switch (switch for a power source), a release switch, an operating mode selecting switch that switches between the recording mode and the playback mode, a probe switch which probes the recording medium if loaded, and other sensing and probing switches (all not shown).

The recording media, on which the image or video information is recorded by the recording and playback devices 14L and 14R, are, for example, magnetic recording media, magneto-optical recording media, and an IC memory card. In this embodiment, a magnetic recording disc is employed as the recording medium.

The operation of the binoculars 1 according to this embodiment will be described.

The binoculars 1 can operate in two modes: a first mode which provides a stereoscopic view of the image of an object formed by the finder optical systems 3L and 3R and viewed through the eyepiece lenses 35L and 35R, respectively; and a second mode which provides a stereoscopic view of an image detected by the image sensors 41L and 41R and reproduced by the displays 34L and 34R and viewed through the eyepiece lenses 35L and 35R.

In the first mode, the displays 34L and 34R are in an inactive state and allow light to pass through. The light rays from an object form optical images on the planes of the displays 34L and 34R through the objective lenses 31L and 31R, the image erecting prisms 32L and 32R and the half mirrors 33L and 33R. The optical images can be observed stereoscopically through the eyepiece lenses 35L and 35R. In the first mode, framing of the picture to be recorded may be conducted. The viewing of the optical images through the finder optical systems 3L and 3R has the advantage of saving battery power by shutting off the video signal processor 5 and does not impose additional strain on the eyes.

In the second mode, the image or video signals of the images to be played back are recalled from the recording medium, and converted and processed as required. The video signals are then displayed on the displays 34L and 34R and at the same time, the back lights 36L and 36R move to a position directly behind the displays 34L and 34R respectively, to illuminate the displays 34L and 34R. These electronically reproduced images can then be stereoscopically observed through the eyepiece lenses 35L and 35R.

The operation of the video signal processor 5 starts with the main switch (not shown) being turned on. If the probing switch probes the loaded magnetic disc and the mode selecting switch selects the recording mode, the loaded magnetic disc begins to turn and is ready to record pictures. At this point the LCD drivers 16L and 16R are in an inactive state and at the same time, the back lights 36L and 36R are placed along the sidewall of the housing 2L and 2R by the back light driver 20.

By observing the stereoscopic images of the object, formed by the finder optical systems 3L and 3R through the eyepiece lenses 35L and 35R, the picture to be recorded can be properly framed. When the release switch (not shown) is turned on, a release signal is transmitted from the switch circuit 18 to the control circuit 17. The control circuit 17 then transmits a signal, based on the signal from the switch circuit 18, to the driver circuit 19 after exposure is completed. The driver circuit 19 then transmits a series of shift pulses to the image sensors 41L and 41R, which then transmit CCD driving pulses.

The analog video signals (in the case of a color CCD, the video signal includes a brightness signal and RGB signals) output from the image sensor 41L of the left telescope and the image sensor 41R of the right telescope, are amplified by the amplifier 11L and 11R and digitized by the A/D converter 12L and 12R, respectively to produce digital image signals. These digital image signals are temporarily stored in the memories 13L and 13R and later recalled from the memories 13L and 13R and recorded on a magnetic disc.

The images detected by the image sensors 41L and 41R are images reflected by the half mirrors 33L and 33R, and are reversed in relation to the optical images formed on the plane of the displays 34L and 34R. To correct for this reversal of the images, the reading sequence of the image signals stored in the memories 13L and 13R is reversed in relation to the writing sequence. This image reversal is done, by the readout address control circuit which forms part of the control circuit 17, when the signals are recalled from memories 13L and 13R.

In the recording operations described above, the image and video signals of the right telescope and the image and video signals of the left telescope are processed separately and are independently recorded on separate tracks of the magnetic disc.

Thus, the binoculars 1 can store on a recording medium stereoscopic images observed through the finder optical systems 3L and 3R.

To playback the prerecorded images, the mode selecting switch is operated to select the playback mode. In the playback mode the magnetic disc is read by the recording and playback devices 14L and 14R. The digital signals output by the recording and playback devices 14L and 14R are temporarily stored in the memories 13L and 13R. The digital signals are then recalled from the memories 13L and 13R and D/A converted by the D/A converters 15L and 15R.

The converted analog image signals are separately input to the LCD drivers 16L and 16R, and displayed as visual images on the displays 34L and 34R by the LCD driving signals transmitted from the LCD drivers 16L and 16R to be observed by each eye. For proper illumination of the displays 34L and 34R, the back lights 36L and 36R are positioned directly behind the displays 34L and 34R by the back light driver 20, and then turned on.

Thus, the reproduced images are displayed on the displays 34L and 34R, respectively, and observed stereoscopically through the corresponding eyepiece lenses 35L and 35R. The reproduced images are the same as the optical images stereoscopically viewed through the viewfinder optics at the time of recording the picture.

As described above, when a picture is to be recorded, the image is viewed optically through the finder optical systems 3L and 3R and the eyepiece lenses 35L and 35R. The image is then framed and focused, and then the release switch is depressed and the picture is recorded. To playback an image, the playback mode is selected. Information related to a desired image is read from a storage medium, processed by the video signal processor 5, displayed on the displays 34L and 34R, and viewed through the eyepiece lenses 35L and 35R.

In the embodiment described above, playback of images is only done when the playback mode is selected by a user. However, it is possible that playback of an image may be automatically done after the completion of a picture taking operation, i.e., the image or video signals are recalled from the memories 13L and 13R and displayed on the displays 34L and 34R for a specified period (e.g. 3 seconds) and then the binoculars 1 are returned to the first mode.

This operation allows a user to confirm that the recorded pictures do not have any defects due to camera vibrations, focus errors etc. since the stereoscopic images may be viewed immediately after recording the picture. In addition, by limiting the playback time to a short period, the user can continue recording pictures with minimal interruption.

As described above, the sequence of reading the image data from the memories 13L and 13R is reversed with respect to the sequence of the image data written to the memories 13L and 13 so that image reversal may be canceled. However, the image reversal may be accomplished by using an optical element, such as a mirror or prism, positioned in between the half mirrors 33L and 33R and the image sensors 41L and 41R.

Figure 4:
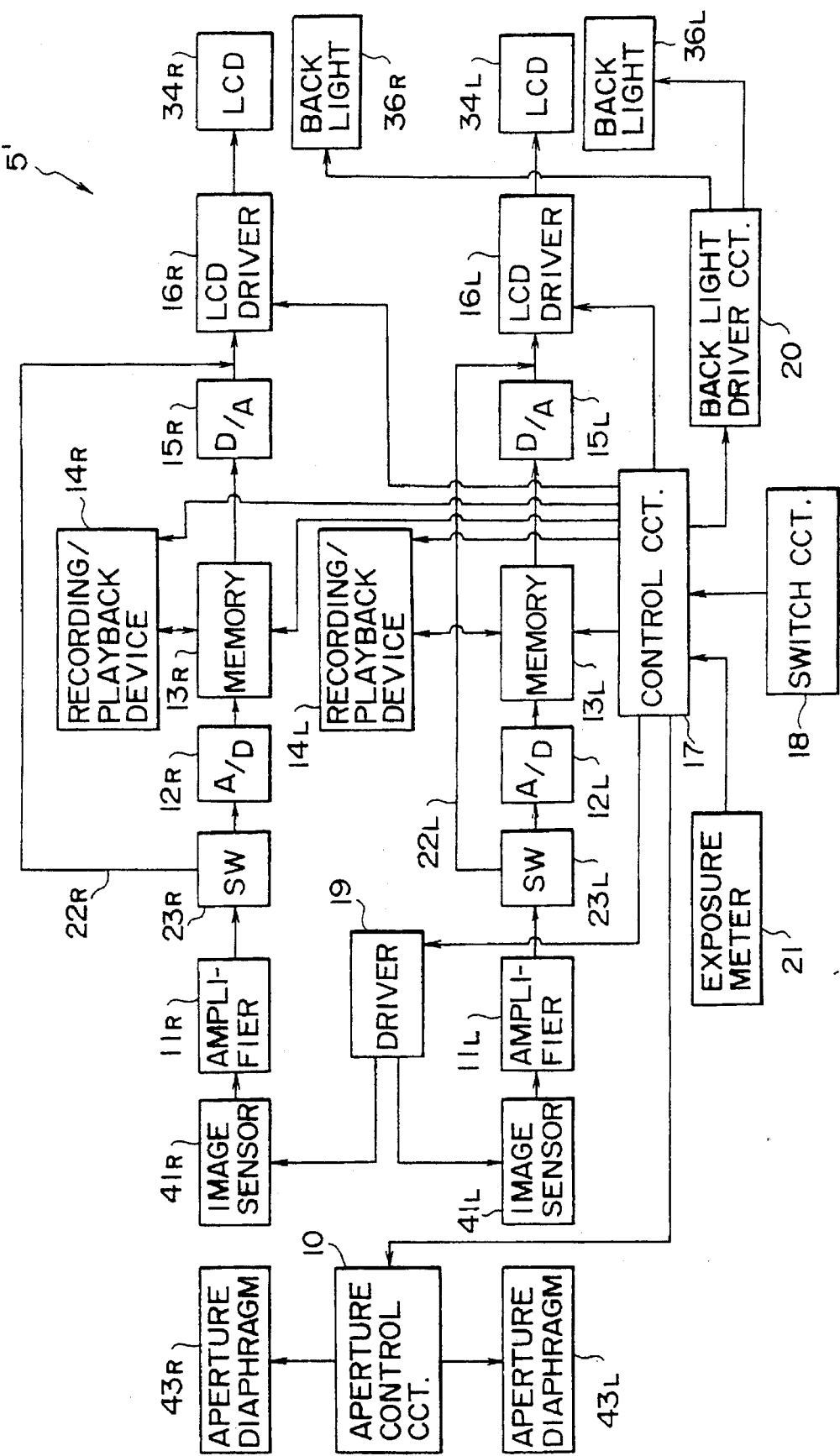
FIG. 4 is a functional block diagram of the binoculars shown in FIG. 1, according to a second embodiment of the present invention.

FIG. 4 shows the video signal processor 5' according to a second embodiment of the present invention. The elements which are common to the image and video signal processor 5 of the first embodiment have the same reference numerals, and will not be described hereafter.

In the second embodiment, the video signal processor 5' further comprises a monitoring mode switch which switches between the first mode, described above, and a third mode, or an electronic image monitoring mode.

In the monitoring mode switching operation, as shown in FIG. 4, switches 23L and 23R and bypass lines 22L and 22R (lines which bypass the memories 13L and 13R) are provided in the video signal processor 5' of the left and right telescopes 2, respectively. When the switches 23L and 23R select the bypass lines 22L and 22R, the analog image or video signals fed from the amplifiers 11L and 11R are transmitted directly to the LCD drivers 16L and 16R. In this configuration, the driver circuit 19 is always turned on while the main switch is turned on.

Therefore, in this mode, analog image signals are continuously transmitted to the activated LCD drivers 16L and 16R via bypass lines 22L and 22R, and thus electronically reproduced moving images are displayed on the displays 34L and 34R which are back lit by back lights 36L and 36R. In order to correct for the image reversal, the LCD drivers 16L and 16R are controlled to send the data to the displays 34L and 34R in reverse order. The electronically reproduced stereoscopic images can therefore be continuously monitored.

When the optically reproduced image monitoring mode is not selected, the LCD drivers 16L and 16R become inactive and the back lights 36L and 36R are moved from behind the displays 34L and 34R, are turned off. The optical images of the object may be monitored directly.

When an image is to be recorded, the switches 23L and 23R connect the output of the amplifiers 11L and 11R to the A/D converters 12L and 12R, and the image can be recorded as described above in the first embodiment. To playback the recorded images on the displays 34L and 34R, the process is the same as described previously.

As an alternate arrangement of the third mode described above, the image or video signals from the image sensor 41L and 41R may be transmitted to the displays 34L and 34R directly and constantly without utilizing the bypass lines 22L and 22R. In this alternate arrangement, the images or video signals are A/D converted by the A/D converters 12L and 12R, stored in memories 13L and 13R, read from memories 13L and 13R in a reverse sequence to the sequence in which the signal was stored in order to correct the image reversal, and then D/A converted by D/A converters 15L and 15R before being sent to the LCD drivers 16L and 16R. Further, the video signals can be recorded on the recording and playback devices 14L and 14R while being viewed.

As described above, the binoculars embodying the present invention may be used as a still photographic camera as well as a video camera which records moving images. By selecting the appropriate CCDs, LCDs, and other processing circuits, the images to be recorded or played back can be color images or black and white images.

Further, a light diffuser (not shown) may be inserted into the optical paths of the finder optical systems 3L and 3R between the half mirrors 33L and 33R and the displays 34L and 34R. The diffuser provides a back light to the displays 34L and 34R and prevents an image formed by the finder optical systems 3L and 3R from being superimposed on the displays 34L and 34R.

The half mirrors 33L and 33R may be replaced with a total reflection mirror which may be moved into an out of position in a manner similar to that employed in a single lens reflex camera. When the binoculars 1 are in the first mode, the mirror would be retracted to the side wall of the housings 2L and 2R but when a picture is to be recorded, the mirror would be inserted into the optical path to redirect the light towards the image sensors 41L and 41R.

This configuration provides brighter images for the electro-imaging process, thereby reducing the exposure time required to record a picture. This will also reduce the effect of vibrations since a shorter exposure time is used. Further, if the mirrors are made to move in opposite directions, shocks caused by the mirror movement may be canceled to reduce the shock effect and increased the image sharpness.

What is claimed is:

1. A pair of binoculars comprising:
   a pair of telescopes; each of said telescopes comprising:
     an image sensor;
     a first optical system for forming an image of an object on said image sensor, said image sensor outputting an electrical signal;
     a second optical system for viewing another image of said object, a portion of said first optical system and a portion of said second optical system having common optical elements; and
     display means for electronically reproducing said electronic signal output by said image sensor; and
   switching means for switching between a first mode in which said another image is viewed, and a second mode in which said image display means electronically reproduces said electronic signal output by said image sensor.

2. The pair of binoculars according to claim 1, said display means positioned at a specified position along an optical axis of said second optical system, said display means allowing light to pass therethrough when said switching means selects said first mode.

3. The pair of binoculars according to claim 1, said first optical system comprising beam splitting means for reflecting a portion of a ray of light corresponding to said image, to be incident on said image sensor, said second optical system also comprising said beam splitting means, said beam spitting means of said second optical system transmitting another portion of said ray of light to be incident on said plane of said image display means.

4. The pair of binoculars according to claim 1, further comprising light blocking means for preventing said another image from being projected on a plane of said image display means when said switching means is in said second mode.

5. The pair of binoculars according to claim 1, further comprising adjustment means for adjusting a distance between said telescopic systems in a direction perpendicular to an optical axis of said second optical system.

6. The pair of binoculars according to claim 1, further comprising image recording means for recording said electrical signal onto a storage medium.

7. The binoculars according to claim 6, further comprising an image playback means to playback said electrical signal stored on said storage medium.

8. The binoculars according to claim 1, said second optical system comprising an objective lens for forming said another image on a plane corresponding to an display plane of said image display means.

9. A pair of binoculars comprising:
   a pair of telescopic systems, each telescopic system comprising:
     a first optical system for forming an image of an object to be viewed on at least two image planes;
     a second optical system for projecting said image formed on one of said image planes;
     an image detecting system for converting said image formed on the other of said image planes to an electrical signal;
     a display for displaying a reproduced image signal based on said electrical signal, said display located between said pair of telescopic systems; and
     a back light, said back light located at a first position which is between said display and said first optical system wherein said back light prevents said image from being formed on said one of said image planes, and a second position wherein said back light allows said image to be formed on said one of said image planes; and
   a controller having two operating modes, wherein when said controller is in one of said operating modes, said back light is located at said first position and said display displays said reproduced image signal, and wherein when said controller is in the other of said operating modes, said back light is located at said second position and said display does not display said reproduced image signal.

10. The binoculars according to claim 9, said display located in a plane coincident with said one of said imaging planes.

11. The binoculars according to claim 9, said first optical system comprising:
    a half mirror; and
    an objective lens system, said half mirror splitting a beam of light, transmitted by said objective lens system and corresponding to said object, to form said image on said at least two image planes.

12. The binoculars according to claim 9, further comprising an adjustment mechanism, to adjust a distance between said telescopic systems in a direction perpendicular to an optical axis of said telescopic systems.

13. The binoculars according to claim 9, said controller having a third operating mode, wherein when said third operating mode is selected said display continuously displays an electronic image corresponding to said image formed on said other imaging plane.

14. The binoculars according to claim 9, said controller further comprising:
    an A/D converter for digitizing said electronic signal output by said image detecting system;
    a memory for storing said digitized signal; and
    a D/A converter for converting said digitized signal to said reproduced image signal to be displayed on said display.

15. The binoculars according to claim 14, further comprising a recording device for recording said digitized signal on a recording medium, said recording device retrieving said digital signals recorded on said recording medium and storing said retrieved digitized signals in said memory.

16. A pair of binoculars comprising:
    a pair of telescopic systems; each telescopic system comprising:
      optical means for forming an image on an image plane;

imaging means for converting said image to an electronic signal;

storage means for storing said electronic signal; and display means for displaying said electronic signal; and control means, said control means having a first operating mode where said image signal is stored in said storage means, and a second operating mode where said electronic signal stored in said storage means is retrieved and displayed on said display means.

17. The binoculars according to claim 16, said optical means forming said image on another plane, and said display means positioned to be coincident with said another plane.

18. The binoculars according to claim 17, wherein when said control means is operating in said first operating mode, said display means is disabled and said image formed on said another plane is visible, and wherein when said control means is operating in said second mode, said display means is enabled and said image formed on said another plane is invisible.

19. A pair of binoculars comprising:

a pair of optical systems, each optical system comprising:

a forming optical system for forming an image of an object to be viewed on at least two image planes;

a projecting optical system for projecting said image formed on one of said image planes;

an image detecting system for converting said image formed on another of said image planes to an electrical signal;

a display for displaying a reproduced image signal based on said electrical signal, said display located between said pair of optical systems; and a back light, said back light located at a first position which is between said display and said forming optical system, wherein said back light prevents said image from being formed on said one of said image planes, and a second position wherein said back light allows said image to be formed on said one of said image planes; and a controller having two operating modes, wherein, when said controller is in one of said operating modes, said back light is located at said first position and said display displays said reproduced image signal, and when said controller is in another of said operating modes, said back light is located at a said second position and said display does not display said reproduced image signal.

* * * * *